United States Patent [19]
Smith et al.

[11] Patent Number: 6,067,582
[45] Date of Patent: *May 23, 2000

[54] SYSTEM FOR INSTALLING INFORMATION RELATED TO A SOFTWARE APPLICATION TO A REMOTE COMPUTER OVER A NETWORK

[75] Inventors: Benjamin Hewitt Smith; Fred Hewitt Smith, both of Belmont, Mass.

[73] Assignee: ANGEL Secure Networks, Inc., Belmont, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,767

[22] Filed: Aug. 13, 1996

[51] Int. Cl.$^7$ ........................................... G06F 15/16
[52] U.S. Cl. ........................ 710/5; 709/203; 395/712
[58] Field of Search ........................ 395/821, 600, 395/615, 200.33, 712, 186, 5; 710/1, 5; 707/104; 709/203, 221; 713/200

[56] References Cited

U.S. PATENT DOCUMENTS

| | | | |
|---|---|---|---|
| 4,658,093 | 4/1987 | Hellman | 380/25 |
| 4,696,003 | 9/1987 | Kerr et al. | 371/19 |
| 4,962,498 | 10/1990 | May, Jr. | 370/94.1 |
| 4,999,806 | 3/1991 | Chernow et al. | 364/900 |
| 5,005,122 | 4/1991 | Griffin et al. | 364/200 |
| 5,023,907 | 6/1991 | Johnson et al. | 380/4 |
| 5,155,847 | 10/1992 | Kirouac et al. | 395/600 |
| 5,247,683 | 9/1993 | Holmes et al. | 395/700 |
| 5,317,744 | 5/1994 | Harwell et al. | 395/700 |
| 5,388,211 | 2/1995 | Hornbuckle | 395/200 |
| 5,421,009 | 5/1995 | Platt | 395/600 |
| 5,438,508 | 8/1995 | Wyman | 364/401 |
| 5,495,610 | 2/1996 | Shing et al. | 395/600 |
| 5,509,070 | 4/1996 | Schull | 380/4 |
| 5,509,074 | 4/1996 | Choudhury et al. | 380/23 |
| 5,671,279 | 9/1997 | Elgamal | 380/23 |
| 5,706,507 | 1/1998 | Schloss | 395/615 |
| 5,708,709 | 1/1998 | Rose | 380/4 |
| 5,708,780 | 1/1998 | Levergood | 395/200 |
| 5,710,883 | 1/1998 | Hong et al. | 395/200.17 |
| 5,732,275 | 3/1998 | Kullick | 395/712 |
| 5,826,014 | 10/1998 | Coley et al. | 395/187.01 |

FOREIGN PATENT DOCUMENTS

| | | | |
|---|---|---|---|
| 0703531 | 3/1997 | European Pat. Off. | G06F 9/44 |
| 0778512 | 6/1997 | European Pat. Off. | G06F 1/00 |

OTHER PUBLICATIONS

Chii–Ren Tsai et al.; Distributed Audit with Secure Remote Procedure Calls; Oct., 1991; pp. 154–160, XP000300426.

Takahata M. et al.; Real–Time Video–On–Demand System based on Distributed Servers and An Agent–Oriented Application; vol. 2663; Jan. 31, 1996, pp. 242–251.

Udo Flohr, "Electric Money"; Jun. 1996; BYTE; pp. 74–84.

Ellen Messmer; "Start–up puts security SOCKS on Windows apps" May 20, 1996; Network World; p. 39.

Ellen Messmer; "Edify Software to Let Banks Open Doors Online" May 20, 1996; Network World; p. 16.

Joanie Wexler; "AT&T Sells Insurers on the Web"; May 20, 1996; Network World; p. 27.

"Set Tool Kit for Secure Commerce"; Bank Systems+Technology; May 1996; p. 16.

(List continued on next page.)

*Primary Examiner*—Thomas C. Lee
*Assistant Examiner*—Harold Kim
*Attorney, Agent, or Firm*—McDermott, Will & Emery

[57] ABSTRACT

A system and method is disclosed for distributing, registering and purchasing software application and other digital information over a network. Each software application is embedded with an agent module which communicates with a remote server module in a server attached to the network. The server module interacts with the user that is requesting installation of the software application and upon verification of billing or other constraints, the server module enables the agent module to proceed with installation. Subsequent to installation, the agent module monitors the server module and informs the user if an update to the software application is available.

24 Claims, 5 Drawing Sheets

OTHER PUBLICATIONS

Margie Semilof; "Boosting Web Business"; Communications Week; May 20, 1996; Section: News Briefs; p. 31.

Martin Marshall; "Banking on the Internet"; Communications Week, May 20, 1996; p. 1.

"Software Taps Net For Supply Data Sharing"; Electronic Buyers News; Apr. 22, 1996; Section: Purchasing; p. 50.

Kim S. Nash and Lisa Picarille; "Vendors Deliver IS–specific Apps Over the 'net"; Computer World; May 6, 1996; Section: News; p. 16.

Jan Ozer; "Online Software Stores"; PC Magazine; May 28, 1996; Section: Trends; p. 36.

Sebastian Rupley; "Digital Bucks? Stop Here"; PC Magazine; May 28, 1996; Section: First Looks; p. 54.

Karen Rodriguez; "Pushing the Envelope"; Communications Week; May 13, 1996; Section: Internet/Internet; p. 37.

Carol Sliwa; "Netscape Unveils New Net Commerce Offerings"; Network World; May 13, 1996; Section: Internet News; p. 10.

Adam Bryant; "Am I Bid Six? Click to Bid Six!"; The New York Times; May 13, 1996; Section D1.

Diane Trommer; "ECS Catalog Merges EDI/Net Platforms"; Electronic Buyers News, May 20, 1996; Section: Purchasing p. 54.

"One Click Software Via the Web"; Datamation, May 1, 1996, p. 16.

Chris Jones; "Licensing Plan Flows From Stream"; Infoworld; May 6, 1996; Section: News.

Stream International Inc.; Stream, LitleNet, BBN, and KPMG Announce Industry–Wide Initiative To Enable Wide–Scale Software Electronic Commerce; May 12, 1996; http://www.stream.com.

C. Anthony DellaFera, et al.; "The Zephyr Notification Service"; USENIX Winter Conference; Feb. 9–12, 1988.

Daniel J. Bernstein; "Let's Talk: Interapplication Communications in C++ Using X properties"; Jan.–Feb. 1996; The X Journal; pp. 37–44.

Daniel Nachbar; "When Network File Systems Aren't Enough: Automatic Software Distribution Revisited"; Summer 1986; USENIX Tech. Conf.; pp. 159–171.

David M. Arnow; "DP: A Library for Building Portable, Reliable Distributed Applications"; Jan. 16–20, 1995; USENIX Tech Conf.; p. 235–247.

Thomas Eirich; "Beam: A Tool for Flexible Software Update"; Sep. 19–23, 1994; USENIX Tech Conf.; pp. 75–82.

Chris Maeda and Brian N. Bershad; "Service without Servers"; Aug. 1, 1993; IEEE, 4th IEEE Workshop on Workstation Operating Systems; pp. 170–176.

Michel Dagenais, Stephane Boucher; Robert Gerin–Lajoie, Pierre Laplante; Pierre Mailhot; "LUDE: A Distributed Software Library"; Nov. 1–5, 1993; USENIX Tech Conf.; pp. 25–32.

Walter C. Wong; "Local Disk Depot—Customizing the Software Environment"; Nov. 1–5, 1993; USENIX Tech. Conf.; pp. 51–55.

Steven W. Lodin; "The Corporate Software Bank"; Nov. 1–5, 1993; USENIX Tech. Conf.; pp. 33–42.

Murray Turnoff and Sanjit Chinai; "An Electronic Information Marketplace"; 1985; North Holland Computer Networks and ISDN Systems 9; pp. 79–90.

Tim Clark; "The Big Sell"; Software Online; Apr. 22, 1996; Inter@ctive Week; pp. 31–35.

Ken Yamada and Barbara Darrow; "Electronic Distribution Program on Tap"; Apr. 29, 1996; Computer Reseller News; pp. 1, 169.

Michael Baentsch, Georg Molter; and Peter Sturm; "WebMake: Integrating Distributed Software Development in a Structure–enhanced Web"; 1995; Computer Networks and ISDN Systems 27; pp. 789–800.

Brian D. Noble, Morgan Price, and M. Satyanarayanan; "A Programming Interface for Application–Aware Adaptation in Mobile Computing"; Fall 1995; USENIX Association, vol. 8, No. 4; pp. 345–363.

Michael B. Jones; "Interposition Agents: Transparently Interposing User Code at the System Interface"; 1993; 14th ACM Symposium on Operating Systems Principals; pp. 80–93.

Diane Trommer; "GE/Netscape Form Software Venture"; Electronic Buyers News; Apr. 22, 1996; Section: Online@EBN; p. 54.

Ellen Messmer; "ActiveX Pioneer Pushes Commerce"; Network World; May 6, 1996; p. 33.

SYSTEM FOR INSTALLING INFORMATION RELATED TO A SOFTWARE APPLICATION TO A REMOTE COMPUTER OVER A NETWORK

BACKGROUND OF THE INVENTION

The invention relates to a system and method for distributing software over a network. More particularly, the invention relates to a method for controlling software distribution by embedding a sub-component of the distribution control software in each software application, and having a central monitoring software for monitoring the distribution of the software applications.

Digitally encoded information, or software, is one of the most economically important commodities of the era. The ease and economy with which perfect copies can be made and distributed has promoted the spread of software and related technologies through traditional commercial channels such as retail and mail-order sales. More recently, non-traditional distribution channels such as distribution over networks of interconnected computers such as the Internet have become more viable. These non-traditional distribution channels have made it difficult for software creators and copyright holders to regulate the use of their creations or to receive payment and registration information from their users. Consequently, software producers forfeit substantial revenues and valuable information about their customer base and potential markets while businesses and universities find themselves subject to legal prosecution and intimidation for software piracy.

Various security methods have been employed in an attempt to inhibit illegal copying of software. Such attempts have included software security, such as password protection and requiring original diskettes to initiate startup, for example, and hardware security, such as a dongle, for example, inter alia. Further, hardware-based copy protection techniques, as well as those which involve modification or customization of executable programs, prevent software vendors from exploiting the non-traditional distribution networks that are becoming a mainstay of software distribution in the software marketplace. Therefore, these protection methods have generally proved inadequate for large-scale commercial distribution of software. Thus, most large software companies have relied on shrink-wrap licenses and legal remedies to enforce their copyrights which have proved moderately effective.

Another challenge to the software industry is regulating the installation of software. Since individual users perform most installations of software, the vendor has no control over the software installation. A user can currently purchase software that will not run on the user's computer. The user may not know the limitations of the user's computer hardware or may not understand the software's hardware requirements. If a user purchases software and the user's computer hardware is inadequate to run the software, then various problems are going to occur in the installation and execution of the software on the user's hardware. The user will have to spend much time and effort attempting to resolve the problem, often including multiple calls to the vendor's technical support lines at a cost to both the vendor and potentially the user.

Additionally, companies having large networked facilities can internally have thousands of networked computers accessible by numerous content servers on a single network. Each of the content servers can be running any of various operating systems as can the computers with which the servers are communicating. From an information management standpoint, maintaining such a computer base can be very difficult given that each user may have to install their own software or, in the case of networked software, each server has an individual copy of networked software for a subset of the users.

Many computer users are reluctant to purchase software on-line due to security issues. The possibility of piracy of the software and, more importantly to the user, personal information inhibits many users from taking advantage of this method of transaction. Some on-line services include security features for such information, but generally lack an ability for the user or the service to audit the security of the transmission. In addition, on-line services generally do not allow the service to keep users informed of new products and releases, unless the users release personal information to the service.

Accordingly, it is an object of the invention to provide a secure system and method for distributing software applications over a computer network and collecting payment therefor.

It is another object of the invention to provide control over the installation of the software application and, if necessary, easy access to technical support.

It is still another object of the invention to provide secure billing and user information for the service providers of the software applications while inhibiting piracy.

It is a further object of the invention to provide a company with an auditable distribution control of software within the company.

It is still another object of the invention to provide independent auditing of software transactions to reassure users of privacy.

These and other objects of the invention will be obvious and will appear hereinafter.

SUMMARY OF THE INVENTION

The aforementioned and other objects of the invention are achieved by the invention which is a system for installing a software application to a remote computer via a network. The network is one which has at least one content server located thereon, which serves data to a plurality of attached computer clients. This network model is intended to include both intranets and internets. That is, the network may be an internal corporate network, an intranet, or a global network of networks such as the Internet, for example. The system comprises a server module and an agent module.

The server module is disposed on the server. The server module maintains a database of software applications and constraints associated therewith. In the case of commercial distribution of the software application, the server module also maintains a database that includes billing information.

The agent module can be embedded in more than one type of software application, and is actuatable by the remote computer to initiate installation of the software application on the remote computer. Upon initiation, the agent module electrically communicates with the server module which selectively enables the installation. In the case of a commercial distribution of the software over the Internet, for example, the user, upon finding a software application which the user wishes to purchase, the user selects the software application. An agent module would then communicate with the server module.

In one embodiment, the agent module would be embedded in the software application the user selected to purchase, and it would be actuatable by the remote computer. After actuation by the remote computer the agent module would communicate with the server module. In another embodiment, the agent module embedded in the software application would remain inactive until after the software application was installed. In this embodiment, a second agent module, which for clarity will hereinafter be referred to as a plug-in, disposed on the remote computer would communicate with the server module. The plug-in would preferably be installed in the user's browser software, which the user is using to connect to the Internet.

The server module can be on a separate remote content server or the same content server upon which the software application is located. The physical location is not important to the individual modules as long as they can communicate electronically. The server module then transfers hardware constraints, pricing information and available options particular to the chosen software application to the remote computer.

The user of the remote computer then accepts the pricing, confirms acceptance of license terms and inputs user information, all of which is then transferred back to the server module as identification information. Upon verified receipt of the user's information, the server module then enables the installation of the software application by communicating with the agent module, either the agent module embedded in the software application or the plug-in embedded in the browser. Installation of the software application can then proceed over the network.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of networks and may be embodied in several different forms, it is advantageously employed in connection with the Internet. Though this is the form of the preferred embodiment and will be described as such, this embodiment should be considered illustrative and not restrictive.

Figure 1:
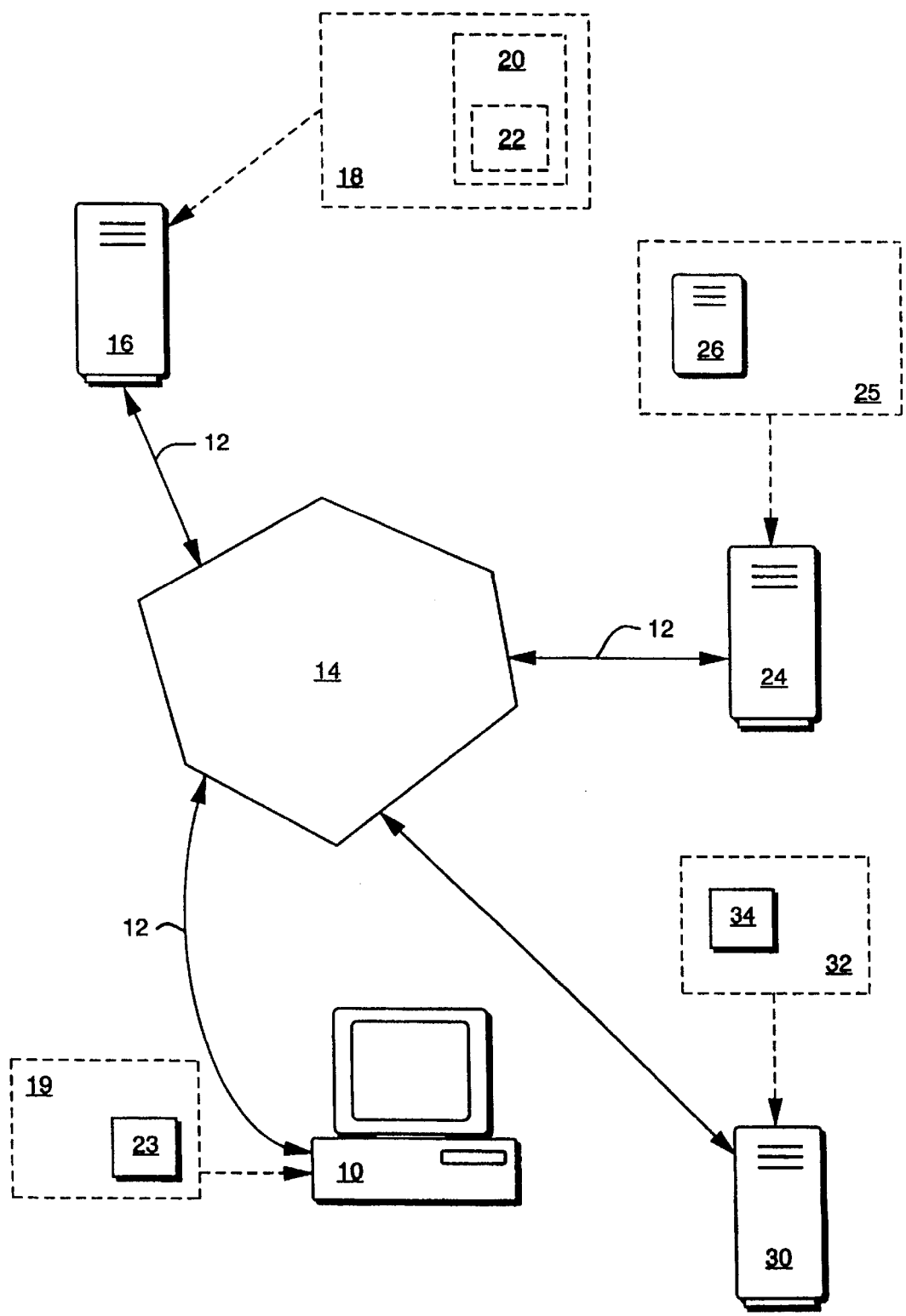
FIG. 1 is a block diagram of the software distribution system of the invention.

Referring now to FIG. 1, a remote computer 10 is shown having an electrical connection 12 to a network 14. The remote computer 10 can be a personal computer, such as an IBM compatible or a MAC, can be a work station, or any other such computer that is adapted to communicate over a network 14. The electrical connection 12 is used generically to indicate a physical connection to a client/server network. Though such a connection can take any of various forms and use any of numerous protocols, in the preferred embodiment communication via the electrical connection 12 uses Transfer Control Protocol/Internet Protocol ("TCP/IP"). TCP/IP is preferred as it is the communication protocol suite required to communicate over the Internet. Communication over the Internet is desirable because the Internet is a global interconnection of multiple content servers which are freely communicable to each other and accessible by an unlimited group of remote computers. For illustration purposes, the network 14 will be assumed to be the Internet, though other possibilities exist, such as electronic mail networks utilizing X.25 protocols.

As previously stated, the network 14 has multiple content servers, one of which is shown in FIG. 1 as content server 16. The content server 16, in this example, is owned by a third-party vendor of software. The software can be any digitally stored information including both executable and non-executable digital information. Examples of the foregoing are executable software applications, digitally stored music, digitally stored reference materials, photographs, inter alia. Therefore, any reference to software or software applications contained herein shall be understood to encompass any form of digitally stored information whether or not listed as an example above.

The third-party vendor uses the content server 16 to sell software by using a virtual store 18. The virtual store 18 generally provides a large listing of available software from which a potential purchaser can choose. When a user of the remote computer 10 decides to purchase a software application 20 from the virtual store 18, the remote computer 10 sends a message via the electrical connection 12 over the network 14 and through another electrical connection 12 to the content server 16. Since the virtual store 18 is simply an application running on the content server 16, the content server 16 actuates the installation functions of the virtual store 18 for the selected software application 20. The installation functions on the content server 16 are generally governed by an agent module which the user of the remote computer 10 is using to access the virtual store 18.

In one embodiment, an agent module 22 is embedded in the software application 20. The agent module 22 is actuatable by the remote computer 10 to access the virtual store 18. The agent module 22 is embedded into the software application 20 by a developer of the software application simply by incorporating a library of functions which make up the agent module 22.

In another embodiment, the agent module 22 embedded in the software application 20 is inactive until after the installation of the software application 20 on the remote computer 10. In this embodiment, a second agent module, a plug-in module 23, is installed on the remote computer 10 and used to access the virtual store 18. The plug-in module 23 is made available on the Internet or other well known resources or by other well known methods, for installation on the remote computer 10 by the user. The plug-in module 23 is preferably disposed in a software package 19, a browser, which the user of the remote computer 10 uses to access the virtual store 18. When the agent module 22 is actuated the agent module 22 and the plug-in module 23 have the same functionality, and the agent module 22 and plug-in module 23 are used interchangeably by this invention, although for clarity the embodiments will refer to one or the other module.

Upon being actuated by the virtual store 18, the plug-in module 23 sends a message via the network 14 to a server module 26 disposed on a remote server 24. One skilled in the art will realize that this example describes a remote server, but the invention will work as described if the server module 26 is also disposed on the content server 16. This particular example allows multiple content servers 16 to communicate with a single server module 26, and therefore the server module 26 is disposed on a data storage apparatus 25, such as a hard disk or any other means for storing digital information, on the remote server 24.

The server module 26 maintains a database of software applications. The developers have previously registered the use of the software application with the server module 26. If the developer had neglected to perform the registration, then this first installation attempt would fail and the server module 26 would attempt to contact the developer.

The database contains information relating to the software applications comprising the name of the application, the developer, hardware constraints, operating or other software constraints, pricing information and any other particular instructions or information helpful for the installation.

The server module 26 then transfers via the electronic connection 12 and the network 14, a dialog box to the remote computer 10. The dialog box posts installation information from the database as well as allows access to the software license agreement for the particular software. If the user chooses to read the license agreement prior to acceptance, the text is sent to the remote computer either from the server module 26, from storage within the database, or a link to the developer's page on the World-Wide Web is exercised. In either case, acceptance of the license is generally required before continuing, though the developer may choose to perform this function during the software installation itself.

In the preferred embodiment, the dialog box displays information prepared by an independent auditor relative to assuring that the installation software performs only certain limited functions strictly necessary for the software installation and does not examine or transfer other data from the remote computer 10. The dialog box also gives the user the option of verifying the credentials of the installer.

If the user exercises the option to verify the credentials of the installer, the plug-in module 23 connects to an audit server 30 maintained by an independent auditor. The plug-in module 23 links to a verification program, which simply incorporates a library of functions that make up an audit module 34, disposed on a hard disk 32 in the audit server 30. The user is then invited to enter a number displayed on the display screen of the remote computer 10 by the plug-in module 23 which is a code representing the installer. The verification program 34 then authenticates the audited installer by providing the installer's name and details regarding the nature of the audit which the auditor has performed. Alternatively, the verification program 34 could be automatically initiated by having the plug-in module 23 transmit the code to the audit server 30.

The user must then input personal information, such as name, address and phone numbers, as well as billing information, such as a credit card number for example. The billing information usually must be included to enable the transaction. In the preferred embodiment, both the billing and the user information are kept confidential and are, therefore, transmitted using secure methods.

Any of various secure methods can be used, such as encoding the information in a known manner readable only by the server module 26, for example. Other such secure methods comprise key-escrow encapsulated within an application program interface ("API") such as a Secure Socket Layer in NETSCAPE, a trademark of Netscape, Inc., or CRYPTOAPI, a trademark of Microsoft Corporation.

Once the billing information is verified and the user information is recorded in the database maintained by the server module 26, the server module 26 transmits an enabling command to the plug-in module 23 which allows transmission of the software application 20 to the remote computer 10. The software application 20 is transmitted as an installation program which is then installed locally to the remote computer 10.

The agent module 22 embedded in the software application 20 remains enabled and active, and maintains communication with the server module 26. At predetermined intervals, once a week for example, the agent module 22 can then correspond with the server module 26 and inquire as to whether any updates are available to the software application. The server module 26 can then inform the agent module 22 of updates or any additional marketing information which the vendor would have the user of the software application 20 know.

Figure 2:
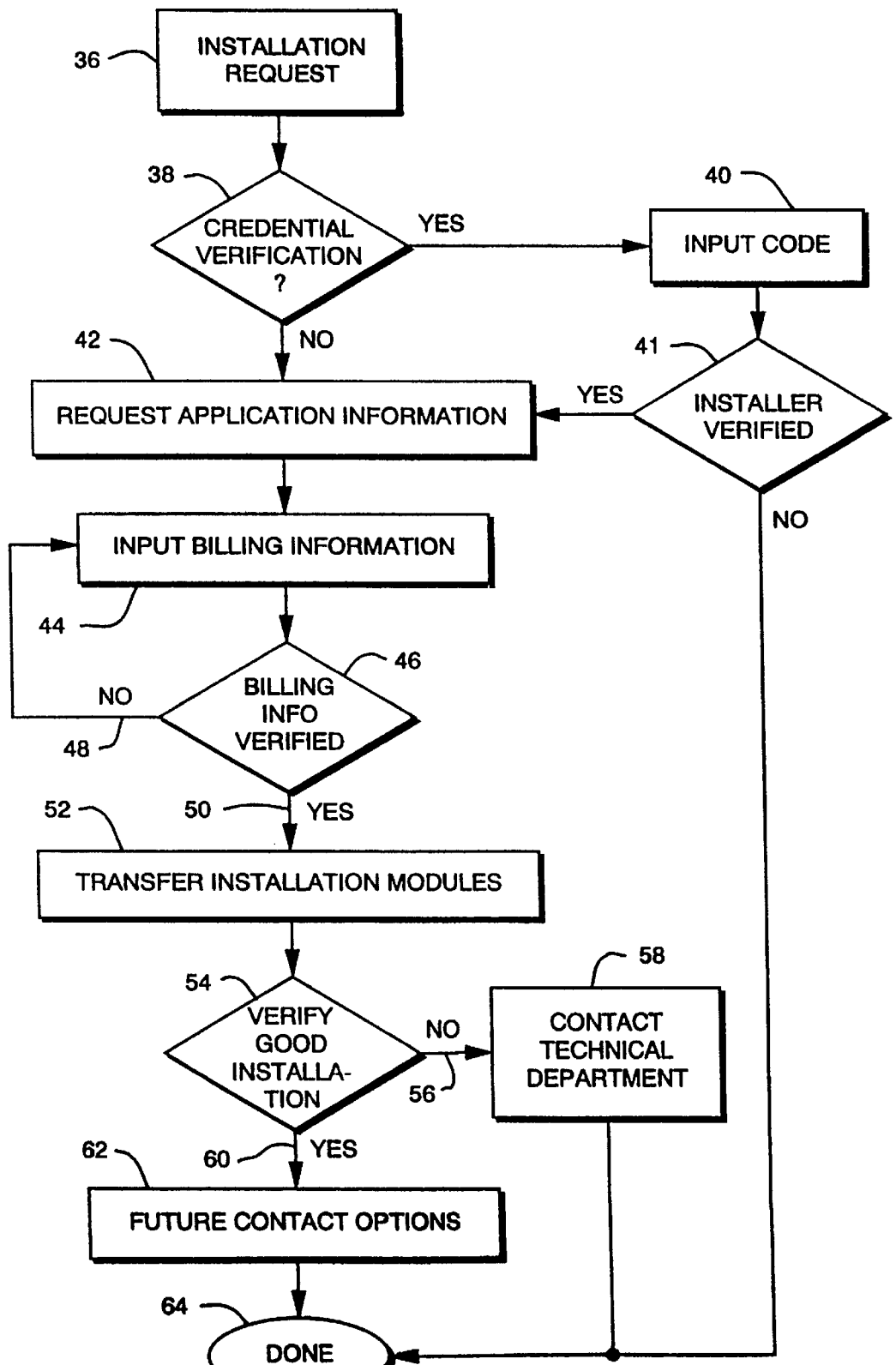
FIG. 2 is a data flow diagram for the installation of software over the system of FIG. 1.

FIG. 2 shows a flow diagram of a method which will be described with reference to the system of FIG. 1.

As previously described, an installation request 36 is first received by the plug-in module 23 after a user decides to purchase the software application 20.

The user is then queried whether installer verification is required 38. If so, then a code given to the user by the plug-in module 23 is input 40. The code helps determine information appropriate to the software application 20 and the installer, which should be transmitted to the user. If the installer information is sufficient and the installer is verified 41, then the installation process is continued. Otherwise, the installation is terminated 64.

The server module 26 is then contacted 42 by the plug-in module 23 and pricing, constraint information, and any special instructions are then transmitted to the user of the remote computer 10.

As previously described, in the preferred embodiment the user is provided with information by the independent auditor regarding the limited functionality of the installing program. The user is given the option of verifying the credentials of the installer. If the user chooses this option, the user is given the option of connecting to the auditor via a Web Browser such as NETSCAPE or directly by the plug-in module 23. Once connected to the audit module housing the verification program 34 disposed on the audit server 30 provided by the independent auditor 36, the user will have the opportunity to review the assurances provided by the auditor and to verify that the installer is known to the auditor. To perform the verification, the user would enter a code which might be a checksum for the installer and the software application 20 of the installer, would appear on the user screen 10. Using this code, the auditor would verify that the installer is certified by the auditor. At this stage, the user also has the option of registering with the installer by entering user information such as name, address and phone number, regardless of whether the user will purchase a software application from the installer. After the verification, the user would also have the option of terminating the installation.

The user then inputs billing information 44. The billing information can be credit card numbers, debit card numbers, a pre-established account number, or a bank account number or any of various other finance related numbers or forms of electronic commerce.

At this stage, the user has the option of entering user information such as name, address and phone number, so that ultimately the installer can track who is using the software application 20. The plug-in module 23 at this point also extracts from the remote computer 10 serial number information or any other information particular to that remote computer 10 that is software accessible. In the preferred embodiment, the other information includes hardware and configuration information of the machine. The remote server 24 via the server module 26 is used to determine whether or not the remote computer 10 is capable of running the software application 20 which the user intends to purchase. Often such serial number information is retrievable simply by making a call to the BIOS of the remote computer 10. Both the information specific to the remote computer 10 and the user of the remote computer 10 may be stored on the data storage apparatus 25 as identification information.

The billing information is then transferred back to the server module 26, which verifies the billing information 46. Such verification in the preferred embodiment is done by communicating the numbers to a central source of verification in much the same manner as is done for conventional transactions. That is, the credit card number is transmitted to a credit card number verification service and a verification code is transmitted back. If the billing information is not accepted 48, then the user is invited to input new billing information 44. If the billing information is accepted 50, then the plug-in module 23 is sent an enabling signal which allows transfer of installation modules 52 of the software application 20 to the remote computer 10. The installation modules are generally executable modules which are created by the server at the time of a request by the plug-in module 23 so as to contain only the particular product options which the user has purchased. Therefore, the executable code can be configured so that it will only operate on the remote computer 10 for which the user has purchased the application software 20.

The executable code is transmitted as a self-extracting executable as is well known in the art. The plug-in module 23 then executes the self-extracting executable which proceeds to automatically install the software application 20 on the remote computer 10.

The user then follows the procedure proscribed therein to install the software on the remote computer 10. The server module 26 during this process monitors the installation to verify the installation 54. Upon completion, the plug-in module 23 in the software application transmits installation information back to the server module 26. If the installation failed, or was unsuccessful 56, then the installation logs and the identification information are transmitted to a technical department 58 of the installer or the developer such that contact can be made to the user directly. The transmission to the technical department can be by any known communication method including manual contact. In the preferred embodiment, however the technical department would be disposed upon the network and in electrical communication with the server module 26. The technical support person would then have, prior to making any contact with the user, complete information related to the hardware and software and the installation attempt, all prior to contacting the user thus expediting the support process.

If the installation was successful 60, then the user inputs whether the user wishes automatic notification of future updates and relevant messages 62. If the future contacts are enabled then each time the vendor of the software application 20 updates the software application 20 or transmits information relevant to the software application 20, the agent module 22 detects the message/change and informs the user.

The procedure is then complete 64.

Figure 3:
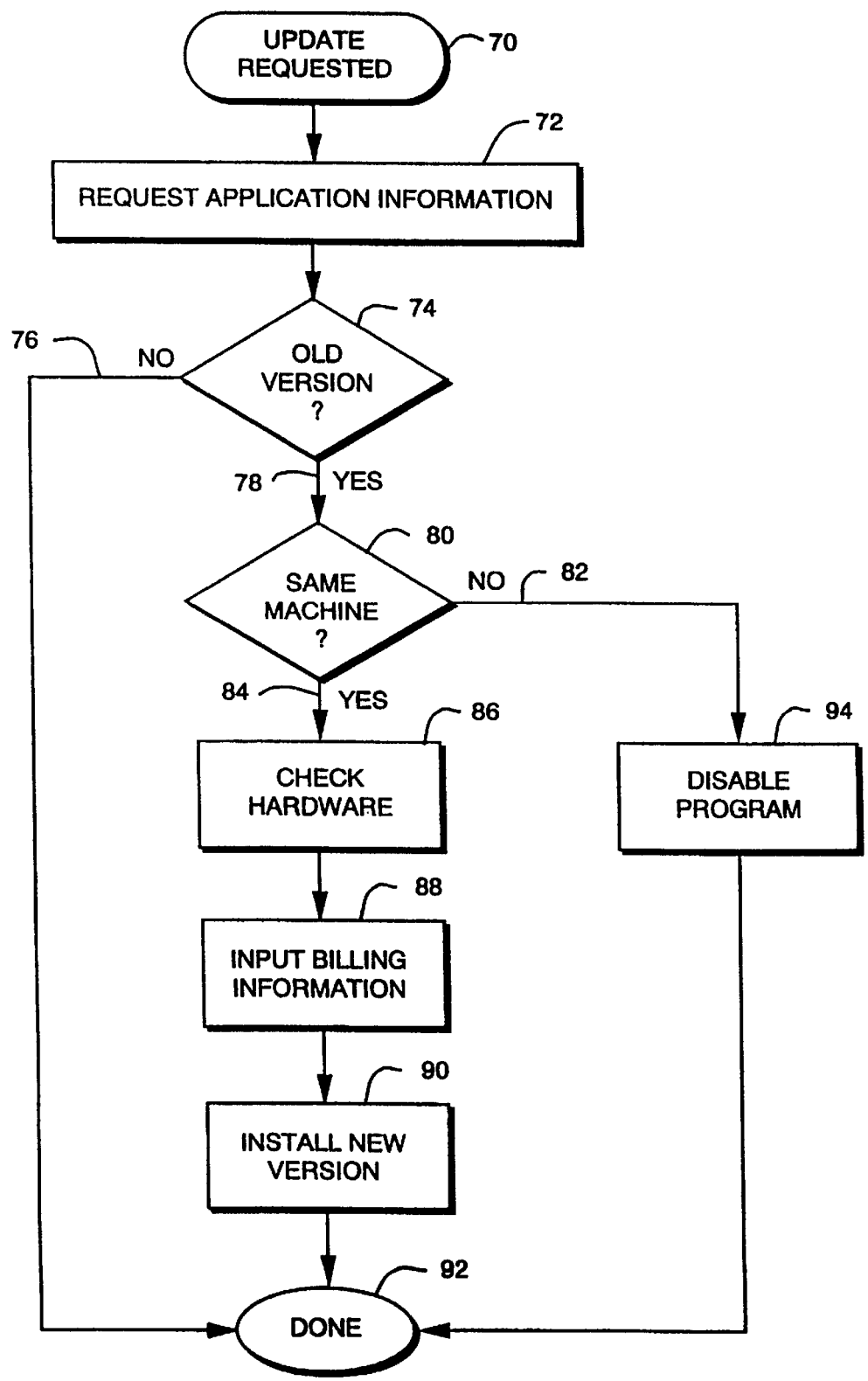
FIG. 3 is a data flow diagram of a software update procedure for the system according to FIG. 1.

FIG. 3 is a method similar to that of FIG. 2 and will be described with reference to the same system of FIG. 1, but in this method an update is being requested 70. An update is requested generally in one of two circumstances: the user has received a demo version of the application software on either a physical medium, such as diskette or CD ROM, or has downloaded a demo version from the vendor, or a new version of the software has been produced by the developer. In either event though, the user is requesting to purchase a new version from the vendor.

If the software is a demo version, then there would generally be a soft button in the graphic user interface ("GUI") that allows the user to buy the software. Selecting the button activates the agent module 22, the agent module 22 then contacts the server module 26. If a new version of the software has been produced then, as previously described, the agent module 22 which periodically contacts the server module 26 for information on new versions has likely informed the user of the availability of the new version. In this case, the agent module 22 is simply being instructed by the user to update the software application 20.

In either event, the update request 70 actuates the agent module 22 to send a signal to the server module 26 requesting the update while also transmitting the identification information 72. The identification information is again secure, like the billing information, and includes user information and computer information specific to the remote computer 10, as well as information relating to the software application 20 which is to be updated.

A check is performed to confirm that the update is being requested by the same remote computer 10 on which the software application 20 was originally installed 80. Then, the server module 26 checks for the availability of a newer or a full version 78. In this way, piracy is inhibited in that the same remote computer 10 must be requesting the update as was the one that originally requested the software application 20. Under some circumstances, the remote computer 10 may change for reasons other than pirating software. Such circumstances can include replacing the computer with a more modern computer or transferring the software application 20 pursuant to the terms of the license agreement to a third party. Under these circumstances, the user may transfer the information specific to the remote computer 10 to the new computer as long as verification is made that the old computer either no longer exists or is no longer loaded with the software application 20.

A comparison 74 is then performed in the remote server 24 to check whether the software application 20 is an old version or is a demo version. If it is the most current version 76, then the procedure is complete 92 and the update request is canceled.

If this request is not made and it is determined that the user is pirating the software 82, then a signal is sent from the server module 26 to the agent module 22 in the remote computer 10 to disable the program 94. The program will then no longer be usable by the remote computer 10 and only the complete new installation including a purchase of the software will re-enable the software.

If the remote computer 10 is the same machine 84, then the hardware constraints are then rechecked 86. This is to insure that the new updated software does not have additional hardware constraints that the previous version had not had.

If the software update is more than simply a maintenance update, there may be additional billing necessary. The user is then enabled to use the previous billing information or input new billing information 88. Upon verification of the billing information, the new version is then installed 90 and the procedure is complete 92.

Figure 4:
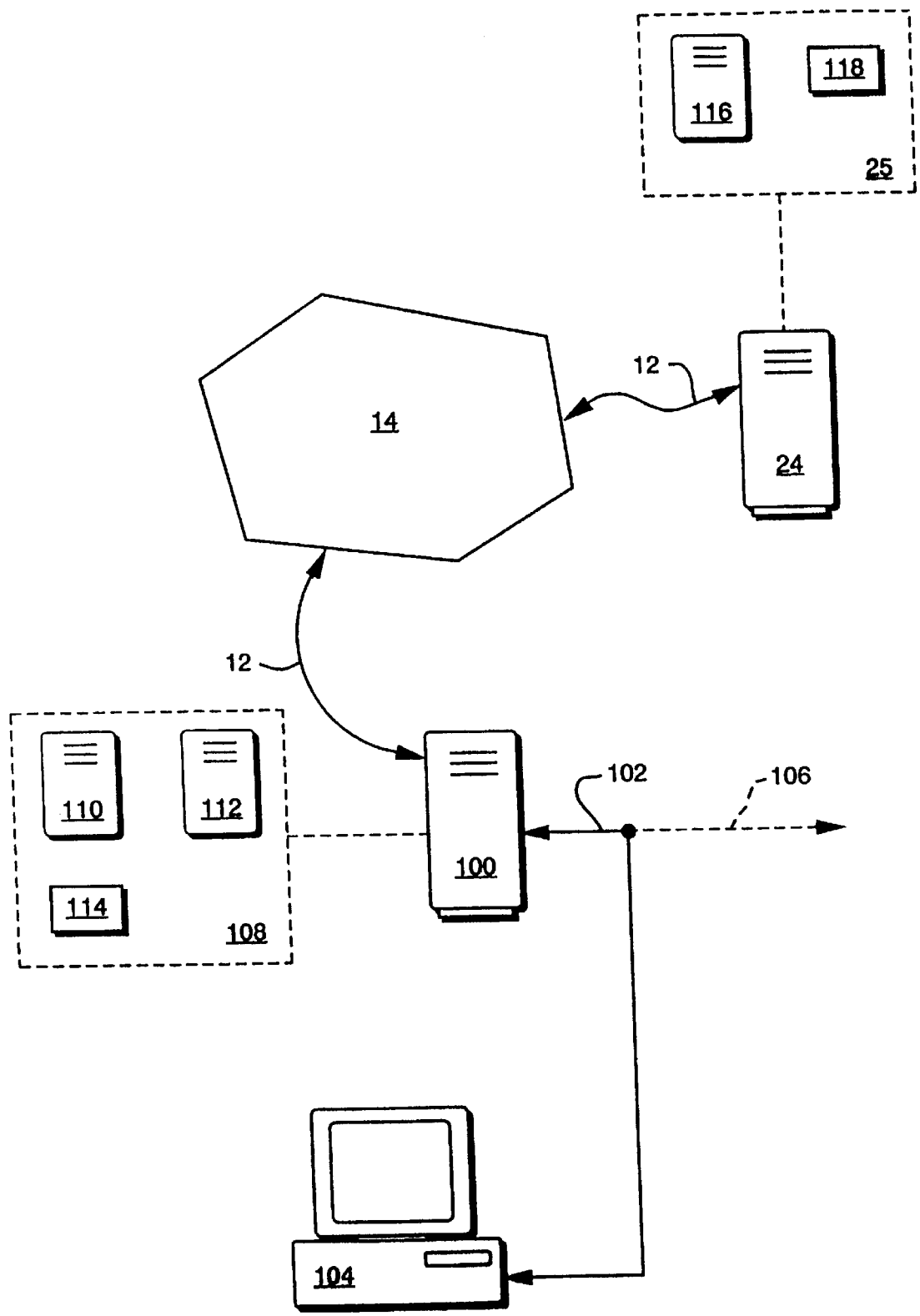
FIG. 4 is a block diagram of a corporate network utilizing the invention.

Referring now to FIG. 4, another application of the invention is shown. A corporate network 102 is shown having a corporate server 100. The corporate server 100 is in electrical communication with both the corporate network 102 and the outside network 14, i.e., the Internet. The corporate network 102 provides a communication bus for a client computer 104 as well as numerous other client and server computers 106.

It should be noted that a typical corporate network, or intranet, of a large corporation is actually quite like the previously described Internet in that a great variety of networks and equipment are linked together through a variety of sub-networks and routers. Again, like the Internet, there is almost no method in such a network to install or de-install software across subnets, and certainly not across different networks.

In this embodiment, the user of the client computer 104 wishes to purchase a new software application. The installation and payment can proceed exactly as previously described for a non-networked computer if so desired. Generally though, a corporate network has network administrators who try to keep software applications uniform and purchasing departments, which try to govern spending. Therefore, in such an installation, the corporate server 100 contains on its hard disk 108 multiple software applications 110, 112, each having an agent module embedded therein as previously described.

The system administrator for the corporate network 102 would generally purchase a predetermined number of licenses for the software application 110 using a method similar to that previously described or upload them directly from a vendor's disk. The user would then access the software application 110 using the client computer 104 via the corporate network 102. Requesting installation of the applications software 110 causes the agent contained therein to contact a server module 114 which, in this embodiment, is stored on the hard disk 108 of the corporate server 100. The server module 114 monitors the number of licenses and, if more are available, then enables the installation.

If additional licenses are required, the server module 114 contacts the remote server 24 and requests additional licenses 116. If the system administrator has approved the transaction, for example by having a standing pre-approval of no more than two additional license without confirmation, then the license 116 is downloaded and a message is sent to the system administrator.

Periodically, an auditing module 118 on the data storage apparatus 25 of the remote server 24 queries the corporate server 100 for information relating to licenses and installations. The server module 114 then transfers such information to the remote server 24.

The capability of being audited by an independent auditor provides a user assurance that the user's privacy will be protected. The auditing system herein described is physically and organizationally separate from a software developer, the virtual store, or, in the case of a corporate intranet, a department of the corporation. This separateness allows for a server to be dedicated to the sole task of installing software and for this server to be placed in a physically secure setting. Thus, the remote server 24 can be situated in a locked room dedicated solely to the task of installing software. By periodically examining the disk of this server with software appropriate for this task, which is well known in the art, the data returned to this server could be verified not to contain any data other than that required to complete the installation.

Figure 5:
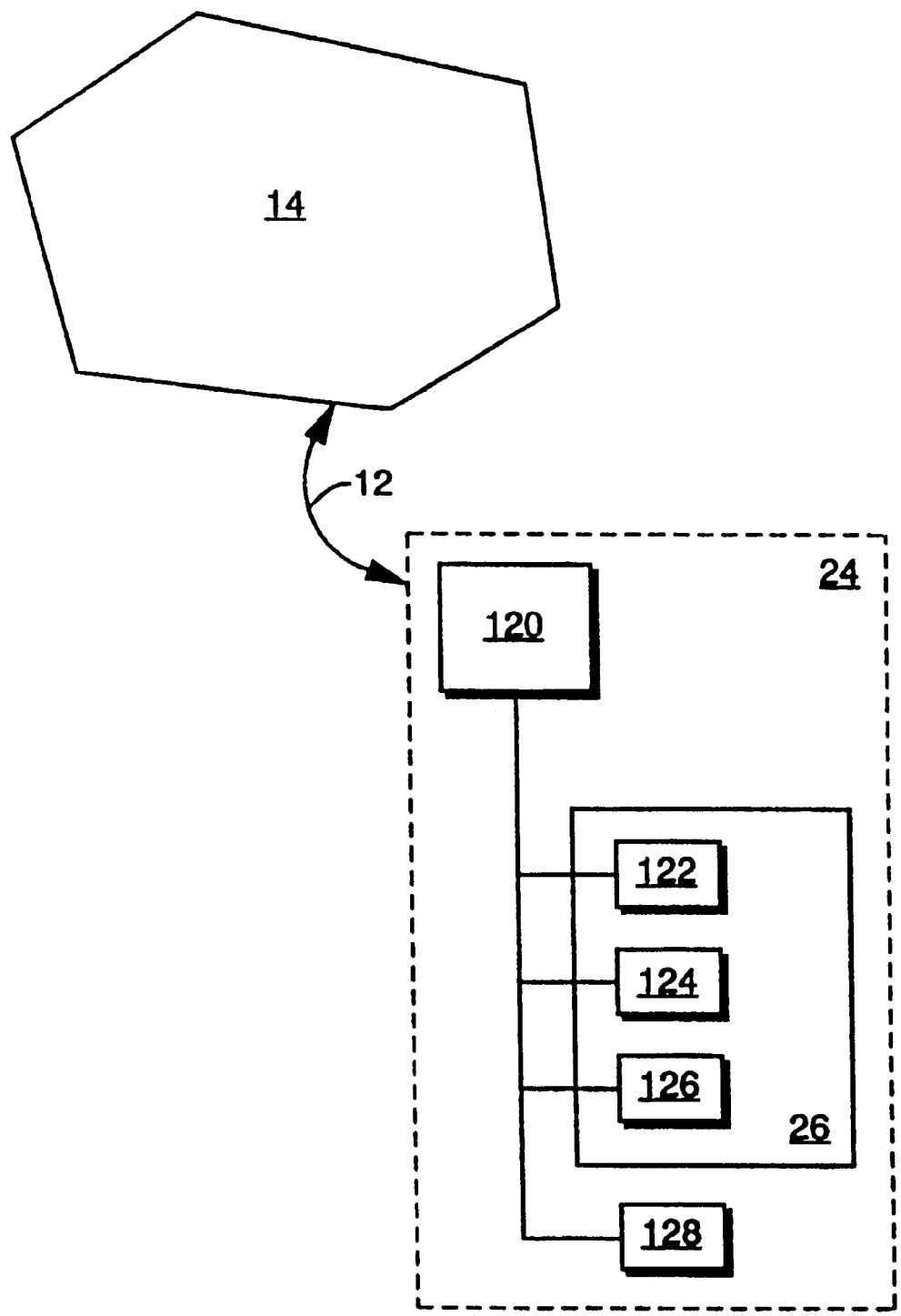
FIG. 5 is a block diagram of an alternative software distribution system of the invention.

FIG. 5 shows a system configuration where the functions previously handled by the single remote server 24 have been divided among several servers and should, therefore, be read with continuing reference to FIG. 1. A router 120 routes incoming data to appropriate servers. Initially, when an agent module contacts the router 120 the request is transferred to the receptionist server 122. The receptionist server 122 verifies that the request is from an authorized agent module, and then transfers the request to server A 124 or server B 126. Servers A and B 124, 126 actually perform the installation.

The receptionist server 122 monitors which of servers A or B 124, 126 are currently busy and routes new requests to the less busy server 124,126. Thus, the use of the receptionist is useful to provide loading to other servers to maintain appropriate levels of service and also provides for a configuration that is highly scalable, since additional capacity can be added simply by adding additional servers.

In an alternative embodiment, each of servers A and B 124, 126 store a predetermined set of applications. The receptionist upon receiving a request for installation of a an application stored on server B 126 automatically routes the request to that server.

Also shown is an audit server 128 which is used to continuously audit the operations of servers A and B 124, 126. In the preferred embodiment, the auditing operation also includes monitoring of data received by servers A and B from user of the remote computer 10. The auditing server 128 communicates with the independent auditor so that periodically or on demand the auditor is able to verify the actual operation of the servers A and B 124, 126.

The auditing operation that would take place has a dual function. The owners of the virtual store 18 are able to have accurate records as to the software that was actually installed. The user of the remote computer 10 would have the assurance that only data needed for the installation and options chosen by the user were in fact transferred to the remote server 24.

An additional design element of the system herein described is that it will use an exclusive audit-capable packet (XAP) to transfer data from the remote computer 10 to the remote server 24. The auditor can audit this capability by examining the C++ code, as described below, by observing a build of the software, and by verifying that the software actually running on the servers is the same software as that produced by the controlled build.

The following are an example of the steps that an independent auditor would use to verify that the software performs in a specific manner and does not violate the privacy interests of the user. The method described below of auditing the functionality of the software will be described using C++ calls. The C++ language is used due to its inherent mechanisms for systematic data typing such that the exact nature of data passed in packets can be controlled and defined. One skilled in the art will recognize that these steps can be performed in other languages with like functionality without departing from the essence of the invention.

In order to certify the operation of the server, the auditor will first examine the software for the server and the agent. The auditor will perform or observe a build of the software from the sources and will verify, through its audit server or by other means, that the software that was built in is the same software actually running on the remote server 24. Finally, the auditor will supplement and confirm this audit by examining the actual data received by the servers.

To accomplish this task, the auditor will determine from the sources that the software can only receive a XAP_Packet class and that the software can only send a XAP_Packet class. The auditor will then examine the software and verify that a XAP_Packet can only contain certain types of data and will note that this data is necessary for the installation of the software and does not include data that is not necessary for installation of the software.

The auditor will verify that the TCP/IP receive function occurs only inside a class XAP_Receive, and appears only inside this class. The auditor will verify that a XAP_Receive class can only be created using a XAP_Packet, and the auditor will observe that the only interface to the rest of the application from the XAP_Receive class is through the XAP_Packet. From these observations, the auditor will be able to conclude that the application can only receive data that can be inserted into a XAP_Packet.

The auditor will verify that the TCP/IP send function is encapsulated in a class XAP_Ship, and appears only inside this class. The auditor will verify that a XAP_Ship object can only be created from, a XAP_Packet, and that therefore, without a XAP_Packet object the application will cannot ship data over TCP/IP. The auditor will verify that the TCP/IP ship function only ships the data provided to it by XAP_Packet. From these observations, the auditor will be able to conclude that the application can only ship data that can be extracted from a XAP_Packet.

From examination of the sources, the auditor will observe that a. XAP_Packet can only be composed of XAP_Record objects. C++ has facilities for defining insertions and extractions from classes, which can limit the insertions and extractions to certain other classes. The XAP_Record classes will be defined in the application. The auditor will examine each of these classes. From examination of the individual XAP_Record classes the auditor will conclude that these classes can be composed only of certain XAP_Data objects. Again the XAP_Record classes will have defined insertions and extractions which will limit the data that can be put into these records to XAP_Data objects. Finally, the auditor will examine the various defined, XAP_Data objects, and will observe that the XAP_Data objects represent the data needed to perform an installation but will not permit other data that might violate a user's privacy. For example, the data objects could have predefined limits on overall length and predefined data values which would render impossible the copying of correspondence from the user's personal computer. The data objects would be limited as to size and content so that bitmaps or spread sheets, for example, could not be copied from the user's personal computer.

The invention may be embodied in other specific forms without departing from the spirit or essential characteristics thereof The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for installing information related to a software application to a remote computer via a network having at least one content server, comprising:

a server module in communication with the at least one content server;

an embedded agent module embedded in a version of the software application, the embedded agent module, when the version of the software application is installed on the remote computer, running under the control of the version of the software application to communicate with the server module;

means for storing the information related to the software application on the content server;

means for installing the version of the software application with the embedded agent module on the remote computer;

means for communicating a request for the information from the embedded agent module to the server module to initiate transfer of the information from the content server to the remote computer, the information being transferred to the remote computer under control of the embedded agent module in communication with the server module.

2. The system according to claim 1 wherein the remote computer in communication with the server module transmits information to the server module.

3. The system according to claim 2 wherein the information transmitted from the remote computer is identification information.

4. The system according to claim 3 further comprising a technical department, in electrical communication with the server module, for selectively receiving the installation log and the identification information transmitted from the server module.

5. The system according to claim 1 wherein the software application provides associated pricing information.

6. The system according to claim 1 wherein the server module is disposed upon the content server.

7. The system according to claim 1 wherein the network is an intranet.

8. The system according to claim 1 wherein the network is an internet.

9. The system according to claim 1 further comprising:

an audit server; and an audit module disposed on the audit server, the audit module in communication with the server module for monitoring information retrieved from the remote computer to determine whether information should be prevented from being retrieved from the remote computer has been retrieved from the remote computer.

10. The system according to claim 9 wherein the audit server is disposed remotely from the content server.

11. The system according to claim 1 further comprising:

an audit server;

an installation file embedded in the agent module; and an audit module disposed on the audit server, the audit module in electrical communication with the server module for communicating to the remote computer information regarding the functionality of the installation file.

12. The system according to claim 11 wherein the audit server is disposed remotely from the content server.

13. The system according to claim 1 further comprising:

an audit server; and an audit module disposed on the audit server in electrical communication with agent module, selectively enabled by the agent module for verifying an installer of the software application.

14. The system according to claim 13 wherein the audit server is disposed remotely from the content server.

15. The system of claim 1 wherein the agent module is embedded in a demonstration version of the software application.

16. The system of claim 1 wherein the agent module comprises:
- means for identifying information related to the remote computer which should be prevented from being retrieved from the remote computer; and
- means for preventing the identified information from being retrieved from the remote computer.

17. A method for installing information related to a software application on a remote computer via a network, the method comprising the steps of:
- including in the software application an embedded agent module, the embedded agent module, when the software application is installed on a computer, running under the control of the software application to communicate with a server module;
- installing the software application with the embedded agent module on the remote computer;
- storing the information related to the software application on a content server in communication with the server module;
- communicating a request for the information from the embedded agent module to the server module to initiate transfer of the information from the content server to the remote computer;
- transferring the information from the content server to the remote computer.

18. A method according to claim 17 further comprising the step of securing the confidentiality of the transfer of the information between the remote computer and the server module.

19. The method of claim 17 further comprising the steps of:
- selectively connecting the remote computer to an audit server, the audit server including an audit module; and
- with the audit module monitoring information retrieved from the remote computer to determine whether information which should be prevented from being retrieved from the remote computer has been retrieved from the remote computer.

20. The method of claim 17 further comprising the steps of:
- selectively initiating the agent module to communicate with an audit module disposed upon an audit server;
- executing a verification program disposed upon the audit server, upon selection by the remote computer to verify the installer of the software application; and
- displaying on the remote computer an output of the verification program.

21. The method of claim 17 wherein the agent module is embedded in a demonstration version of the software application.

22. The method of claim 17 further comprising, with the agent module:
- identifying information related to the remote computer which should be prevented from being retrieved from the remote computer; and
- preventing the identified information from being retrieved from the remote computer.

23. The method of claim 17 wherein the server module is disposed on the content server.

24. A method for auditing an agent module to verify the installation of a software application on a remote computer by the agent module comprising the steps of:
- providing the agent module with a means for identifying information related to the remote computer which should be prevented from being retrieved from the remote computer and means for preventing the identified information from being retrieved from the remote computer, the agent module being embedded in the software application;
- providing an audit module on an audit server in communication with the agent module, the audit module disposed remotely from the agent module;
- with the audit module, monitoring information retrieved from the remote computer to determine whether information which should be prevented from being retrieved from the remote computer has been retrieved from the remote computer; and
- examining the software application, said examining comprising:
  - ascertaining that the software application exclusively transmits a unique packet, the unique packet selectively encapsulated by a transmit header generated from the unique packet;
  - ascertaining that the software application exclusively receives the unique packet, the unique packet selectively encapsulated by a receive header generated from the unique packet;
  - verifying the unique packet exclusively contains predetermined objects; and
  - verifying the predetermined objects are necessary to the functionality of the installation of the software application.

* * * * *